(No Model.)
J. M. DAKAN.
Nut Lock.
No. 235,751. Patented Dec. 21, 1880.
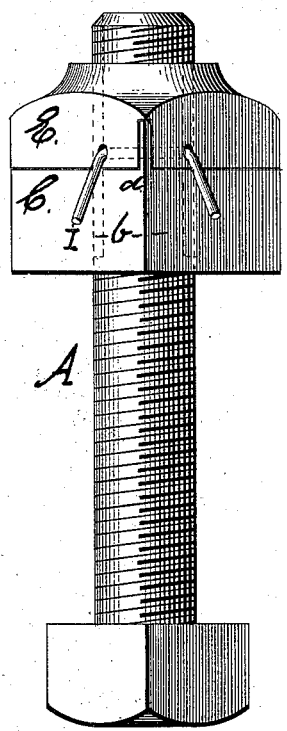
Fig. 1.
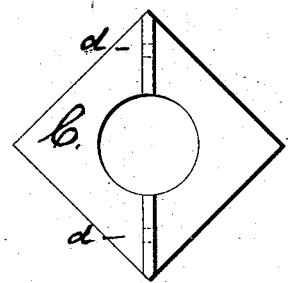
Fig. 2.
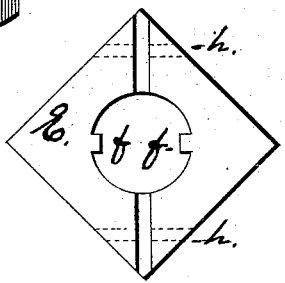
Fig. 3.
Fig. 4.
Witnesses:
Saml. W. Mathews
Everett H. Criswell
Inventor:
John M. Dakan
by Jno. B. McLeod
his attorney.

UNITED STATES PATENT OFFICE.

JOHN M. DAKAN, OF ROSBY'S ROCK, WEST VIRGINIA.

NUT-LOCK.

SPECIFICATION forming part of Letters Patent No. 235,751, dated December 21, 1880.

Application filed April 19, 1880. (No model.)

*To all whom it may concern:*

Be it known that I, JOHN M. DAKAN, of Rosby's Rock, in the county of Marshall and State of West Virginia, have invented a new and useful Improvement in Nut-Locks, which improvement is fully set forth in the following specification and accompanying drawings.

The object of my improvement is to furnish a device to prevent the nuts of screw-bolts, when in use, from being jarred off the bolts; and it consists of a screw-bolt provided with one or more small grooves cut lengthwise across the threads—a screw-nut for the same provided on its top side with one or more small projections with a small hole in each— a washer, provided with one or more small tongues to fit into the grooves in the bolts, and one or more grooves to receive the tongues on the nut, with holes in the washer passing through said grooves and matching with the holes in the tongues on the nut, and a key or wire passing through said holes in the tongues, on the nut, and on said washer, and secured thereto by the bending of its ends.

In the accompanying drawings, Figure 1 is a perspective view of my complete nut-lock. Fig. 2 is a top view of the nut; Fig. 3, a like view of the washer, and Fig. 4 is a top view of the washer when adjusted to the bolt just above the top of the washer.

Similar letters refer to similar parts throughout the several views, in which—

A is the bolt, provided with two grooves aforesaid, as shown by the vertical dotted lines marked $b$; C, the nut, provided with projecting tongues, (indicated by the dotted lines $d$;) E, the washer, provided with the projecting tongues aforesaid, $f$, and the apertures aforesaid, (indicated by the dotted lines $h$,) and I the key aforesaid.

It will be noticed that the tongues on the nut must be made to fit the grooves in the washer, and also the tongues on the washer to fit the grooves in the bolt.

I would suggest also that the tongues on the nut may be made on the washer, and the grooves in the washer made in the nut, if the same should be thought more economical in their manufacture.

Having described my invention, what I claim as new and desire to secure by Letters Patent, is—

A nut-lock consisting of a screw-bolt with a small groove lengthwise across its threads, a nut to fit the same, provided on its top side with a small projecting tongue, with a hole through the same, a washer with a projecting tongue to fit the groove in the bolt, and a groove therein to receive the projecting tongue on the nut, with an aperture through the same matching the one in the tongue on the nut, and a key or wire passing through said apertures and made fast therein by the bending of its ends, combined as above set forth.

JOHN M. DAKAN.

Witnesses:
JOHN B. MCLURE,
JOHN A. EWING.